(12) United States Patent
Marble et al.

(10) Patent No.: US 9,512,828 B2
(45) Date of Patent: Dec. 6, 2016

(54) BI-FIELD SOLAR GEOTHERMAL SYSTEM

(71) Applicant: Crowder College, Neosho, MO (US)

(72) Inventors: Alan Marble, Neosho, MO (US); Art Boyt, Neosho, MO (US); Dan Eberle, Stella, MO (US)

(73) Assignee: Crowder College, Neosho, MO (US)

( * ) Notice: Subject to any disclaimer, the term of this patent is extended or adjusted under 35 U.S.C. 154(b) by 109 days.

(21) Appl. No.: 14/215,970

(22) Filed: Mar. 17, 2014

(65) Prior Publication Data

US 2014/0260247 A1   Sep. 18, 2014

Related U.S. Application Data

(60) Provisional application No. 61/791,498, filed on Mar. 15, 2013.

(51) Int. Cl.
*F03G 7/04* (2006.01)

(52) U.S. Cl.
CPC . *F03G 7/04* (2013.01); *Y02E 10/10* (2013.01)

(58) Field of Classification Search
CPC ........... F03G 7/04; Y02B 10/20; Y02B 10/40; Y02B 10/70; Y02E 10/10; Y02E 10/46
USPC ................................. 60/651, 671; 165/45, 47
See application file for complete search history.

(56) References Cited

U.S. PATENT DOCUMENTS

| | | |
|---|---|---|
| 4,299,277 A | 11/1981 | McGregor |
| 4,360,056 A | 11/1982 | O'Connell |
| 4,456,056 A * | 6/1984 | Sills ...................... F24F 5/0017 165/104.11 |
| 4,633,676 A | 1/1987 | Dittell |
| 4,979,374 A | 12/1990 | Kabakov et al. |
| 7,827,814 B2 | 11/2010 | Slater |
| 7,856,843 B2 | 12/2010 | Enis |
| 8,122,944 B2 | 2/2012 | Clark |
| 2009/0121488 A1 | 5/2009 | Bhatti et al. |
| 2010/0018228 A1 | 1/2010 | Flammang et al. |

(Continued)

FOREIGN PATENT DOCUMENTS

KR   20010027409   4/2001

*Primary Examiner* — Audrey K Bradley
*Assistant Examiner* — Dapinder Singh
(74) *Attorney, Agent, or Firm* — Millikin Intellectual Property Law, PLLC; Margaret Millikin

(57) ABSTRACT

A bi-field solar geothermal system and method. A ground source geothermal heat pump system comprises two discrete hot and cold loops operated in conjunction with solar panels. Heat acquired from the solar panels is stored in a hot geothermal loop for use during colder weather. The alternative use of cooled fluid, passed through the solar panels, enables removal of heat from a cooled geothermal loop for use during hot summer months. The system comprises a valve system in working communication with the hot geothermal loop and the cold geothermal loop and a control system for controlling the operation of valves and determining when to switch from the hot geothermal loop to the cold geothermal loop. The system further may comprise a hydronics system, an energy recovery ventilation system, sensors for measuring temperature, dew point, flow rates, humidity, occupancy, light levels and other system data and for automatically balancing system operations for maximum efficiency and radiant panels for providing radiant heat to the building or absorbing radiant heat from sources in a structure.

17 Claims, 4 Drawing Sheets

(56) References Cited

U.S. PATENT DOCUMENTS

| | | |
|---|---|---|
| 2010/0223171 A1 | 9/2010 | Baller |
| 2010/0230071 A1* | 9/2010 | Slater .................. F24D 11/0221 |
| | | 165/45 |
| 2010/0270005 A1 | 10/2010 | Radhakrishnan et al. |
| 2010/0288482 A1 | 11/2010 | Bull |
| 2011/0094500 A1 | 4/2011 | Hulen |
| 2011/0265972 A1 | 11/2011 | Maxwell |
| 2011/0265974 A1 | 11/2011 | Maxwell |
| 2011/0272117 A1 | 11/2011 | Hamstra |
| 2011/0289953 A1 | 12/2011 | Alston |
| 2011/0314856 A1 | 12/2011 | Willgohs |
| 2012/0255302 A1* | 10/2012 | Hugelman .............. F22B 1/167 |
| | | 60/651 |
| 2012/0255706 A1* | 10/2012 | Tadayon .................. F24J 3/081 |
| | | 165/47 |

* cited by examiner

BI-FIELD SOLAR GEOTHERMAL SYSTEM

CROSS REFERENCE TO RELATED APPLICATIONS

This application claims priority to provisional patent application Ser. No. 61/791,498 which is entitled BI-FIELD SOLAR GEOTHERMAL SYSTEM, filed Mar. 15, 2013, the entirety of which is incorporated herein by reference. The period of pendency of the foregoing provisional application Ser. No. 61/791,498 is extended to Mar. 17, 2014 since the date for taking action to file a utility application under 35 U.S.C. §111(a) claiming priority to the provisional application falls on a Saturday.

TECHNICAL FIELD OF THE INVENTION

The present invention relates generally to geothermal systems and more particularly, to solar powered geothermal systems having both hot and cold fields. A method of heating and cooling a building with a solar geothermal system also is provided.

SUMMARY OF THE INVENTION

The present invention is directed to a bi-field geothermal heating and cooling system. The system comprises a subterranean heat storage field, a subterranean cold storage field, a heating circuit and a cooling circuit. The heating circuit is in communication with the subterranean heat storage field for circulating a heating fluid, transferring heat to the heating fluid and storing heat in the subterranean heat storage field. The cooling circuit is in communication with the subterranean cold storage field for circulating a cooling fluid, removing heat from the cooling fluid and storing cold in the subterranean cold storage field. The system further comprises a plurality of solar panels through which fluid in the heating circuit and fluid in the cooling circuit travel and a control system and a plurality of sensors for measuring temperatures of the fluid entering and exiting the plurality of solar panels. When the temperature of the fluid entering the plurality of solar panels measures a predetermined temperature in comparison to the temperature of the fluid exiting the plurality of solar panels, the control system automatically switches operation to the cooling circuit if the temperature of the fluid entering the plurality of solar panels is warmer than the temperature of the fluid exiting the plurality of solar panels and automatically switches operation to the heating circuit if the temperature of the fluid entering the plurality of solar panels is cooler than the temperature of the fluid exiting the plurality of solar panels.

The present invention further is directed to a method of heating and cooling a building having a geothermal system with a plurality of solar panels through which heating fluid from a subterranean heating circuit may be circulated and cooling fluid from a subterranean cooling circuit may be circulated. The method comprises the steps of measuring the temperature of the fluid entering the plurality of solar panels, automatically switching to the cooling circuit if the temperature of the fluid entering the plurality of solar panels is warmer than the temperature of the fluid exiting the plurality of solar panels, and automatically switching to the heating circuit if the temperature of the fluid entering the plurality of solar panels is cooler than the temperature of the fluid exiting the plurality of solar panels.

The foregoing and other objects, features, and advantages of the invention will appear more fully hereinafter from a consideration of the detailed description that follows.

DETAILED DESCRIPTION OF THE INVENTION

Figure 1:
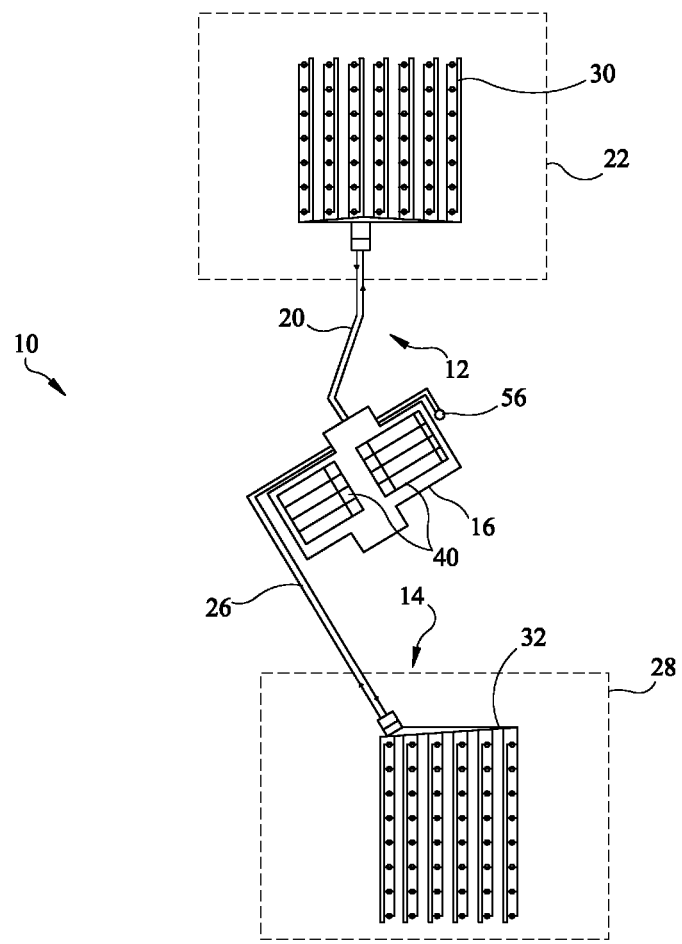
FIG. 1 illustrates a plan view of an exemplary ground source heat pump geothermal system configuration of the present invention.

Efforts to develop reliable, cost-effective alternative energy sources to traditional, large scale fossil fuel power generation have multiplied over the past several decades. A number of factors have driven this effort, including questions concerning the long term availability of these fuels, volatile price fluctuations, control of reserves by foreign governments, and environmental interests.

Due to these concerns, entities in private industry, governments and institutions of higher education have labored to develop alternative energy sources and to secure a stable, affordable, sustainable energy future for generations to come. Out of these efforts, a number of alternative, clean energy sources have emerged. Wind, solar, hydroelectric, geothermal and biomass power present substitutes to traditional fossil fuel and nuclear fuel cell generated power. These conventional renewable systems generally are not able to supply constant sources of power or thermal energy without drawing from the power grid.

Conventional ground source heat pump geothermal systems, also called GSHP or geoexchange systems, add heat to the ground during summer where heat is stored for later extraction during winter to heat a building. Conventional GSHP systems have a narrow window of functionality and tend to operate best in temperate climates. Geothermal systems typically are proficient at either heating or cooling a system, depending on the temperature of the earth, but do not operate efficiently at both heating and cooling a structure.

Geothermal systems installed in northern climates generally cool but do not heat well, whereas in warmer climates, the systems heat but do not cool well. In the northern regions of the northern hemisphere, ground source geothermal heat pump systems are sized based on the heating load of the building or structure where the system is employed and typically tend to be used only for heating. The disadvantage in these locales is that heat is extracted from colder ground in northern climates but is not balanced by heat rejection for space cooling. The inverse is true in southern regions, where ground source heat pump systems are sized based on the cooling load and where heat is injected into the ground for space cooling but is not balanced by extraction for space heating. Consequently, due to the variances in subsurface ground temperatures between northern and southern locales, conventional geothermal systems will have varying degrees of efficiency and cost-savings.

The present invention efficiently heats and cools in both hot and cold climates, as well as in temperate climates. A unique design in geothermal loop systems comprises two separate, discrete hot and cold loops operated in conjunction with solar panels. Heat acquired from the solar panels is stored in a ground source heat loop, or hot geothermal loop, for use during colder weather. The alternative use of cooled fluid, passed through the hybrid solar panels, enables removal of heat from a second ground source loop, or cooled geothermal loop, for use during hot summer months. A system of changeover valves and a control system enable automatic or efficient switching from one loop to the other under predetermined conditions.

Furthermore, the present invention provides a comprehensive renewable power supply and thermal energy system using various sources of clean and renewable energies that collect heat and convert energy, including wind power, solar power and a geothermal heating and cooling system with the dual fields, and creates net positive energy production.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

Turning now to the drawings in general and to FIG. 1 in particular, there is shown therein an embodiment of a ground source heat pump geothermal system 10 of the present invention. As used herein, the phrase "ground source heat pump geothermal system" may be used interchangeably with "GSHP system." The GSHP system 10 comprises two separate, discrete loops including a hot geothermal loop 12, also called a hot loop, and a cold geothermal loop 14, also called a cold loop. The GSHP system heats and cools structure 16 and further may be adapted to provide electric power and heated and cooled water to the structure.

The hot geothermal loop 12 includes a heating circuit 20 that communicates with a subterranean heat storage field 22, also called a hot field, where heat flow accumulates and increases the temperature of the hot field. The discrete cold geothermal loop 14 includes a cooling circuit 26 that communicates with a subterranean cold storage field 28, or cold field, where cold flow accumulates and reduces the temperature of the cold storage field. The hot geothermal loop 12 carries a heating fluid through the heating circuit 20, while the cold geothermal loop 14 carries a cooling fluid through the cooling circuit 26, in a manner yet to be described.

The heat storage field 22 and the cold storage field 28 each comprise a plurality of buried pipes or tubing called ground loops. The hot ground loops 30 of heat storage field 22 and the cold ground loops 32 of the cold storage field 28 each communicate, either directly or indirectly, with the functional components of structure 16 in a manner yet to be described for the purpose of transferring heat.

The pipes comprising the hot and cold ground loops 30 and 32, respectively, are buried to a depth of between about 15 feet to about 300 feet deep within the earth. The hot and cold ground loops 30 and 32 are placed below the frost line where the temperature is relatively stable, depending upon latitude. Alternatively, either the hot ground loops 30 or the cold ground loops 32, or both, may be submerged in a body of water. The hot and cold ground loops 30 and 32 may be horizontal or vertical configurations, or some orientation in between, depending upon geography and requirements of the site where the GSHP system 10 is to be installed. For example, a vertical configuration for the hot and cold ground loops 30 and 32 may be used where the conditions are too shallow for horizontal trenching or to minimize disruption the landscape or surrounding structures.

The hot and cold ground loops 30 and 32 may be installed in various loop configurations or other designs known in the art. The number of pipes or tubing comprising the hot and cold ground loops 30 and 32 and their size and diameter will be commensurate with the size of the hot and cold storage fields 22 and 28, the parameters of the structure 16 that is to be heated or cooled, and other conditions. In one embodiment of the invention, the hot ground loops 30 comprises a vertical configuration of 49 buried loops made of ¾ inch diameter high density polyethylene, and the cold ground loop comprises a vertical configuration of 48 buried loops made of ¾ inch diameter high density polyethylene, each with a 20×20 foot grid spacing. While particular diameters, configurations, spacings and depths are mentioned here, it will be appreciated that a multitude of buried ground loop configurations may be employed in the heat storage field 22 and cold storage field 28.

The hot ground loops 30 and cold ground loops 32 may be formed from a variety of thermally conductive metal or plastic materials, such as polyvinyl chloride (PVC), polyvinyl ethylene (PVE), high density polyethylene (HDPE), copper, or metal pipe that is coated or encased in a corrosion-resistant material. The material selection for the hot and cold ground loops 30 and 32 is determined in part by conditions at the location where they will be installed, such as soil conditions, soil composition, water content, and depth.

The heat storage field 22 and the cold storage field 28 are separated by a sufficient distance to prevent transfer of heat from one field to the other. The distance between the fields will vary based upon geological conditions at the site, for example soil composition, water content and natural geologic structures. Preferably, the respective heat storage field 22 and cold storage field 28 should be at least from about 10 to about 150 yards apart. In one embodiment of the invention, the heat storage field 22 and cold storage field 28 are about 100 yards apart.

Figure 2:
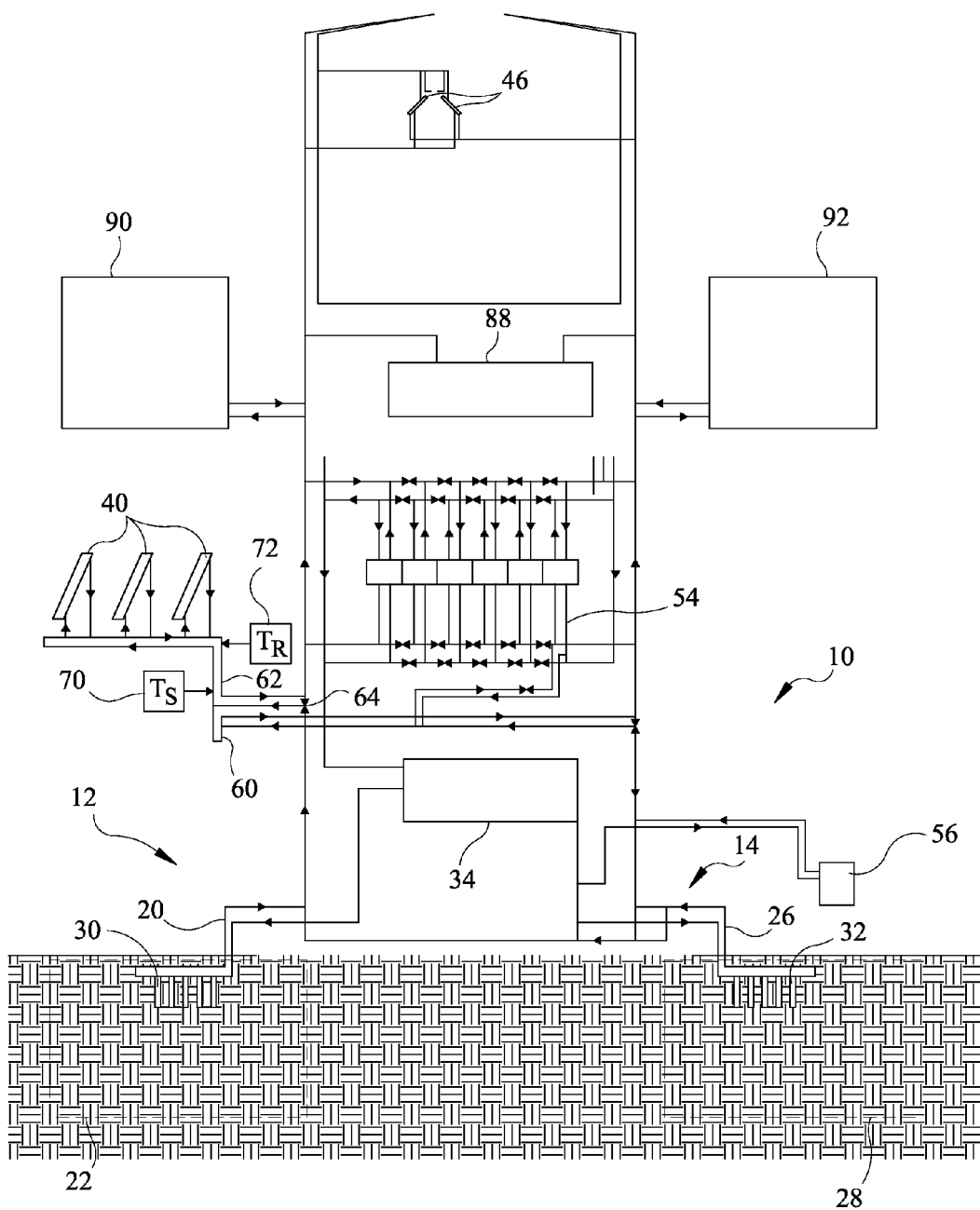
FIG. 2 illustrates a flow schematic an exemplary ground source heat pump geothermal system of the present invention.

Turning now to FIG. 2, but with continuing reference to FIG. 1, it will now be appreciated that each of the hot geothermal loop 12 and the cold geothermal loop 14 circulates a fluid by which temperature changes are affected in the operation of the GSHP system 10. The circulating fluids can be any fluid suitable for carrying heat, such as water, propylene glycol, ethylene glycol, denatured alcohol and methanol. Typically, propylene glycol or ethylene glycol are preferred fluids due to their physical and chemical properties and for environmental safety. Optimally, the fluid is characterized by having a low freezing point and a high boiling point to allow a wider temperature range in the operation of the geothermal system 10. To that end, the GSHP system 10 further comprises one or more fluid systems 34 for storing and processing the circulation fluids. The fluid system 34 may comprise, for example, glycol and water tanks, air separators and expansion tanks, not shown. The fluid system 34 communicates with the hot geothermal loop 12 and the cold geothermal 14.

Figure 3:
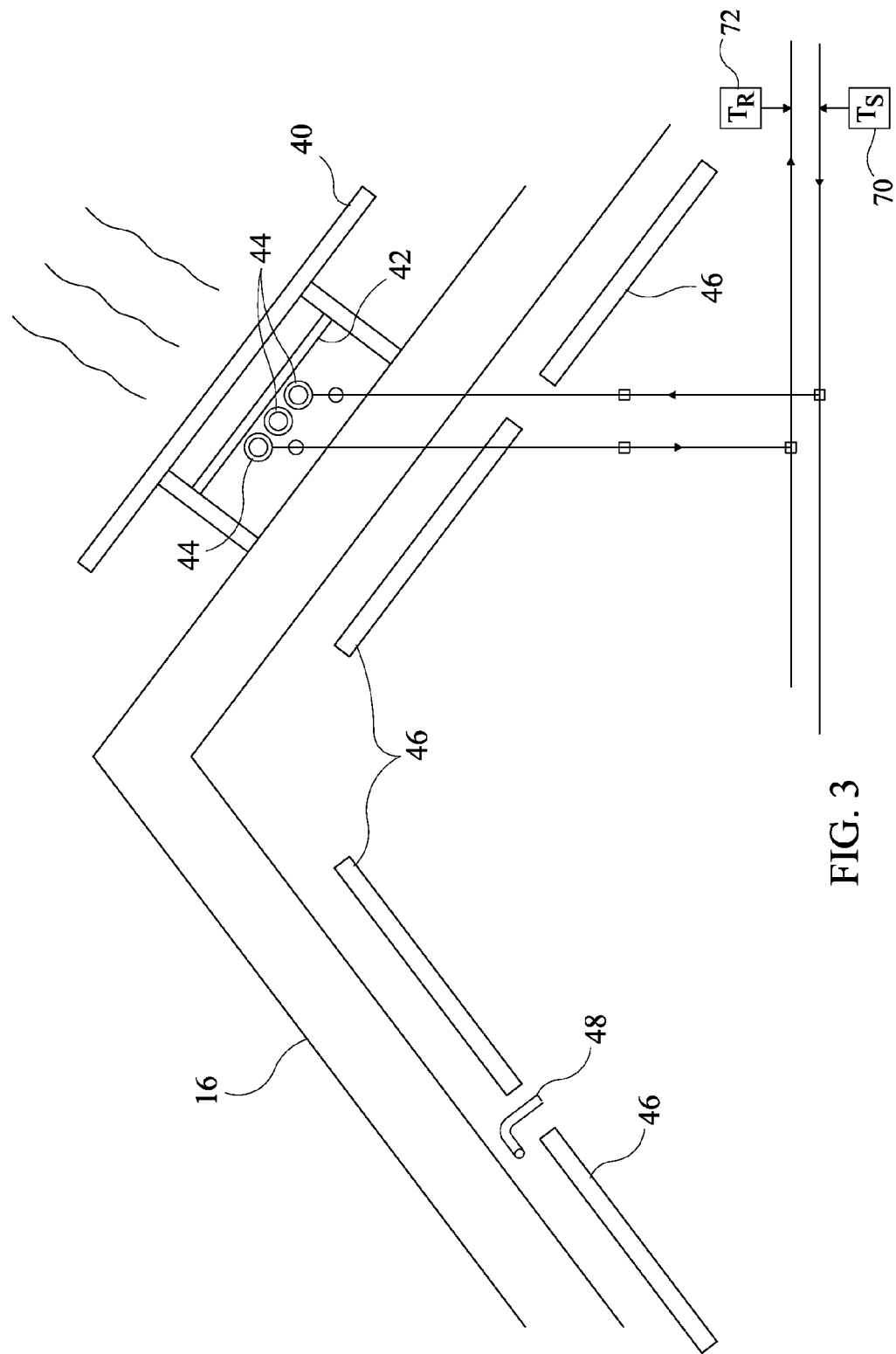
FIG. 3 illustrates a cross-sectional view of an exemplary solar panel used in the source heat pump geothermal system of the present invention.

Turning now to FIG. 3, and with continuing reference to FIGS. 1 and 2, the GSHP system 10 of the present invention further comprises a plurality of solar panels or collectors 40 in fluid communication with the hot geothermal loop 12 and the cold geothermal loop 14. The plurality of solar panels 40 may include photovoltaic, thermal, flat panels and hybrid panels, but which are modified to comprise a manifold 42 in connection with the underside of each solar panel 40. Although a variety of solar panels 40 are suitable or adaptable for use in the ground source heat pump geothermal system 10 of the present invention, the solar panels 40 should have the capacity to absorb radiant heat. In one embodiment of the invention, hybrid solar panels 40 are preferred since fluid passes through a plurality of tubes 44 connected with manifold 42 on the underside of each panel. The fluid circulating through tubes 44 may be the same fluids used in connection with the hot geothermal loop 12 and the cold geothermal loop 14 of the GSHP system 10. The plurality of tubes 44 are made of any material suitable for carrying the working fluids in the system GSHP 10, such as copper, polyvinyl chloride (PVC), polyvinyl ethylene (PVE), high density polyethylene (HDPE) or metal pipe that is coated or encased in a corrosion-resistant material. The hybrid solar panels 40 capture heat or cold from the top side of the solar panels and either heat or cool the fluid traveling through the plurality of tubes 44 on the underside of the panels. The heated or cooled fluid travels to the heating circuit 20 or the cooling circuit 26, as the case may be. One example of a hybrid solar panel suitable for use in connection with the present invention is sold by Sol Source Greenbuild in Neosho, Mo.

The size and number of solar panels 40 will be a function of the type of solar panel used in the GSHP system 10, the requirements of the building, geographical and topographical considerations and the particular application where the GSHP system 10 is to be employed.

The plurality of solar panels 40 may be arranged as known in the art to achieve optimal heating and cooling operational efficiency. Such arrangements will be a function of the topography of the ground, characteristics of the building being conditioned, and geographic location, which in turn determines the angle at which sunlight strikes the solar panels. For example, a 37 degree angle is optimal for longest year-round use in certain locations, while 45 degrees is more efficient for winter time use. In one embodiment of the invention, arranging the solar panels 40 so that they form a serrated configuration allows the height of the ceiling of the building to be raised to accommodate radiant panels 46 and piping 48 for communicating with a fluid-to-fluid heat pump system 54, shown in FIG. 2, to assist in heating and cooling the structure 16. The solar panels 40 may be arranged in series so that fluids pass through the solar panels sequentially from either the heating circuit 20 or the cooling circuit 26.

The operation of collecting solar heat or cooled air from the solar panels 40 which is then transferred to the hot geothermal loop 12 or the cold geothermal loop 14 now will be described. Both the hot geothermal loop 12 and the cold geothermal loop 14 are substantially simultaneously in constant operation, except during periods of clement weather when the ambient air temperature is close to the desired building temperature.

In summer, heating fluid travels through the hot geothermal loop 12 and through the tubes 44 in the solar panels 40 and absorbs the heat collected by the panels. The working heating fluid travels through a series of pipes and valves and through the heating circuit 20 to the hot ground loops 30, where heat is transferred to the heat storage field 22 until it is needed for later use.

In winter, the heating fluid travels through the hot geothermal loop 12 from the heat storage field 22, where the temperature of the heating fluid is increased by contact with the hot ground loops 30 in the heat storage field. The heating fluid travels to and from the heat storage field 22 where the temperature of the heating fluid is increased by absorbing heat from the hot field 22. From the heat storage field 22, the heating fluid circulates to the fluid-to-fluid heat pump system 54 where the heating fluid may be transmitted to the fluid-to-fluid heat pump system 54 to condition the structure 16. The heat pump system 54 removes heat from the heating circuit 20 and transfers it to the fluid-based radiant panels 46 or through an alternative system for heating the structure 16, such as a forced air or fluid-to-air delivery system.

The fluid-to-fluid heat pump system 54 supplies the associated structure 16 with radiant heat or pulls heat from heat sources in the building, such as from humans or appliances in the structure. Alternatively, the heat pump system 54 may work with a fluid-to-air or other forced air delivery system for heating the structure 16. During winter, the heating fluid does not circulate through the collection of solar panels 40. Rather, the hot geothermal loop 12 is isolated from the solar panels 40 during winter, and the cooling fluid circulates through the solar panels in a manner yet to be described.

Substantially contemporaneously, the cooling fluid, in winter, circulates through the solar panels 40 where the fluid is cooled. The cooling circuit 26 then carries the cooled fluid to the cold ground loops 32 where heat is removed from the cold storage field 28. The colder temperatures of the cold storage field 28 will be maintained until summer when cooled air is needed for cooling the structure 16 or the water supply to the structure or for other purposes. The cold storage field 28, which is isolated from the heat pump system 54 in winter, communicates with the solar panels 40, and cooling fluid flows from the solar panels 40 to the cold storage field 28. Through this process, the cold geothermal loop 14 transports a cooling fluid, by which process heat is removed from the cooling fluid and by which the temperature of the heat in cold storage field 28 is reduced.

With continuing reference to FIGS. 1 through 3, during summer, the cold geothermal loop 14 circulates cooling fluid from the cooling circuit 26 to the fluid-to-fluid heat pump system 54. The cold geothermal loop 14 is isolated from the solar panels 40, while the heating fluid in the hot geothermal loop 12 circulates to the solar panels during warm summer weather. The fluid-to-fluid heat pump system 54 supplies the associated structure 16 with cooled air from the cold geothermal loop 14 through the radiant panels 46 or an alternative system. The cooling fluid is cooled by passing through the subterranean cold storage field 28 and accepting heat from the heat pump system, then returning to the cold storage field to be cooled again.

The GSHP system 10 may further comprise an ice storage tank 56 comprising a heat exchange system that supplements the provision of cooled air to the cold field 28 in the summer or that cools the hot field 22 if it overheats during winter. The ice storage tank 56 will be sized for the particular geothermal system conditions, heat pump system and the specifications of the structure 16 for which it is employed. In operation, cooling fluid is diverted from the cold geothermal system 14 through the ice storage tank 56 where ice is generated. In one embodiment of the invention, the tank comprises a 1,655 gallon ice storage tank. In another embodiment of the invention, the ice storage tank 56 is subterranean and may be buried below the frost line where the temperature is relatively stable, depending upon latitude.

Figure 4:
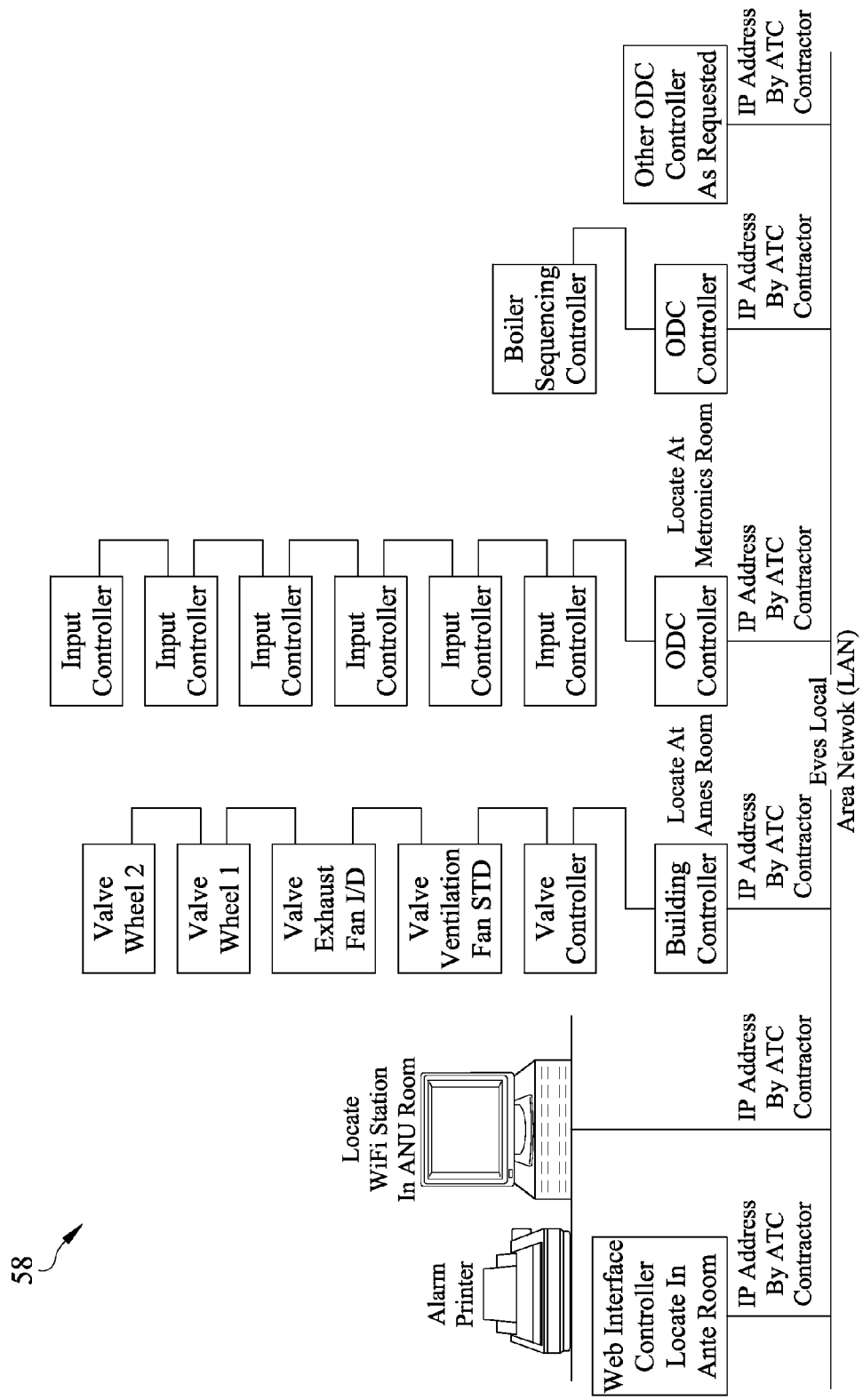
FIG. 4 illustrates a schematic of an exemplary control system used in the ground source heat pump geothermal system of the present invention.

Turning now to FIG. 4 and with continuing reference to FIG. 2, the GSHP system 10 of the present invention further comprises a control system 58 and a system of changeover valves 60, 62 and 64 to assist in switching the interaction of the plurality of solar panels 40 between the hot geothermal loop 12 and the cold geothermal loop 14. Appreciating that either cooling fluid or heating fluid substantially continuously circulates through the plurality of solar panels 40, supply line temperature sensor 70 and return line temperature sensor 72 are positioned near the supply and exit points, respectively, of the working fluid to and from the solar panels. Supply temperature sensor 70 measures the temperature of the fluid entering the plurality of solar panels 40 at Ts, while return temperature sensor 72 measures the temperature of fluid exiting the plurality of solar panels at TR and returning to either the hot field 22 or the cold field 28, as the case may be. The temperature data from temperature sensors 70 and 72 are transmitted to the control system 58 which automatically activates the changeover valves 60, 62 and 64 and switches operation of the GSHP system 10 from one circuit to the other if the temperature data meet certain predetermined parameters. The GHSP system 10 will automatically transfer operation from hot geothermal loop 12 to the cold geothermal loop 14 if the sustained temperature of the fluid entering the plurality of solar panels 40 is warmer than the temperature of the fluid exiting the plurality of solar panels, and vice versa.

For example, if the temperature, as measured over a predetermined period of time, of the return fluid exiting the plurality of solar panels 40 is a specified degree warmer than the temperature of the fluid entering the solar panels for a predetermined period of time, the solar panel operating mode will be heating. When the solar panels 40 are in heating mode, the control system 58 positions the heating circuit changeover valves 60 so that heating fluid is circulating through the solar panels. The cooling circuit changeover valves 62 will be positioned so that cooling fluid bypasses the solar panels 40 and is diverted through changeover valves 64 to the heat pump system 54.

Conversely, if the temperature of the fluid leaving the solar panels 40 is a specified degree colder that the temperature of the fluid entering the panels, over a predetermined period of time, the solar panel operating mode will be cooling. When the solar panels 40 are in cooling mode, the cooling circuit changeover valves 62 are positioned so that the cooling fluid is circulating through the panels. The heating circuit changeover valves 60 will be positioned so that the heating fluid bypasses the solar panels and heating fluid circulates through changeover valves 64 to the heat pump system 54.

As a more specific example, if the fluid in the hot geothermal loop 12 temperature is above a specific temperature as measured at supply temperature sensor 70, for example 120° F., then the heating circuit 20 will be enabled for heating. The heat pump heater valves will be opened to isolate the fluid-to-fluid heat pump. If the hot geothermal loop 12 is below a specified temperature, and the cold geothermal loop is above a specified temperature, then control valves turn off, changing over the heating and cooling circuits. When the hot geothermal loop 12 is above a specific temperature, for example, 110° F., and the cold geothermal loop is below a specific temperature, for example, 50° F., then the changeover valves will be in their normal open positions.

It further will be appreciated that during warm months when the hot geothermal loop 10 is circulating heating fluid through the solar panels 40, there may be periods when it is beneficial to switch communication with the solar panels from the hot geothermal loop 12 to the cold geothermal loop. Even in warm seasons, the control system 58 may switch to the cold geothermal loop 14 for defined periods of time and purposes. For example, hybrid solar panels, which produce electricity, work more efficiently when the temperature remains below a defined level, for example 120 degrees Fahrenheit. If the solar panels 40 become too hot for optimized operations, temperature sensors at the solar panels send data to the control system 58, which will divert cooling fluid from the cold geothermal loop to the solar panels until the temperature of the panels is once again below the defined level. Conversely, the control system 58 may be programmed to switch from the cold geothermal loop 14 to the hot geothermal loop during winter predetermined conditions and purposes.

In addition to sensing temperature of the fluid at the plurality of solar panels 40, the GSHP system 10 also comprises sensors for measuring dew point, flow rates, humidity, occupancy, light levels, temperature at other points of the system and other system data and for automatically balancing system operations for maximum efficiency. The control system 58 receives data from these sensors for the purpose of monitoring system performance and making control decisions. It will be appreciated that the control system 58 illustrated in FIG. 4 is simply one possible configuration for the control system. The schema that the GSHP system 10 uses to communicate with the control system 58 will permit alterations and variations to exist, depending upon the particular setup at the structure 16. In addition, the control system 58 may comprise a variety of software systems enabling sensing, monitoring, data collection and analysis of system performance.

The heating circuit 20 may be used for chilled water production 88, and the cooling circuit 26 may be used for heated water production 90. The present invention may further comprise an energy recovery ventilation system 92 that provides latent cooling and further comprises a dual energy wheel unit. One such system suitable for use in the invention is manufactured and sold by Trane. The invention further may comprise radiant heating and cooling panels and piping systems, suitable examples of which are manufactured by Trane. The invention may further comprise a hydronics room for installation and operation of heat pumps and piping and change-over valves adapted to switch from the heating circuit to the cooling circuit or for the operation of the fluid-base radiant system, sensors for measuring temperature, dew point, flow rates, humidity, occupancy, light levels and other system data and for automatically balancing system operations for maximum efficiency. The present invention also may comprise other sources of renewable power for the generation of electricity, such as wind power.

It now will be appreciated that the present invention efficiently heats and cools in both hot and cold climates, as well as in temperate climates through employment of separate, discrete hot and cold loops operated in conjunction with solar panels and a system of changeover valves and a control system enabling automatic and/or efficient switching from one loop to the other under predetermined conditions. It furthermore will be appreciated that the present invention provides a comprehensive renewable power supply and thermal energy system using various sources of clean and renewable energies that collect heat and convert energy, including wind power, solar power and a geothermal heating and cooling system with the dual fields, and creates net positive energy production.

The invention of this application has been described above both generically and with regard to specific embodiments. Although the invention has been set forth in what is believed to be preferred embodiments, a wide variety of alternatives known to those of skill in the art can be selected within the generic disclosure. Changes may be made in the combination and arrangement of the various parts, elements, steps and procedures described herein without departing from the spirit and scope of the invention as defined in the following claims.

Having thus described the invention, we claim:

1. A bi-field geothermal heating and cooling system, comprising:
    a subterranean heat storage field;
    a subterranean cold storage field;
    a heating circuit in communication with the subterranean heat storage field for circulating a heating fluid, transferring heat to the heating fluid and storing heat in the subterranean heat storage field;
    a cooling circuit in communication with the subterranean cold storage field for circulating a cooling fluid, removing heat from the cooling fluid and storing cold in the subterranean cold storage field;
    a plurality of solar panels through which fluid in the heating circuit and fluid in the cooling circuit travel; and
    a control system and a plurality of sensors for measuring temperatures of the fluid entering and exiting the plurality of solar panels;
    wherein, when the temperature of the fluid entering the plurality of solar panels measures a predetermined temperature in comparison to the temperature of the fluid exiting the plurality of solar panels, the control system automatically switches operation to the cooling circuit if the temperature of the fluid entering the plurality of solar panels is warmer than the temperature of the fluid exiting the plurality of solar panels and automatically switches operation to the heating circuit if the temperature of the fluid entering the plurality of solar panels is cooler than the temperature of the fluid exiting the plurality of solar panels.

2. The geothermal system of claim 1 wherein the solar panels comprise hybrid solar panels.

3. The geothermal system of claim 1 where in the solar panels are arranged in series and fluids pass through the solar panels sequentially from either the heating circuit or the cooling circuit.

4. The geothermal system of claim 1 further comprising radiant panels for providing radiant heat.

5. The geothermal system of claim 1 further comprising a system of change-over valves adapted to switch from the heating circuit to the cooling circuit.

6. The geothermal system of claim 5 wherein the control valves allow direct cooling from the cooling circuit and direct heating from the heating circuit.

7. The geothermal system of claim 1 further comprising an ice storage tank, wherein the ice storage tank is in fluid communication with the cooling circuit and creates and stores ice generated by the cooling fluid.

8. The geothermal system of claim 7 where in the ice storage tank further chills the cooling fluid for circulation through the cooling circuit.

9. The geothermal system of claim 1 further comprising an energy recovery ventilation unit.

10. The geothermal system of claim 9 wherein the energy recovery ventilation unit provides latent cooling and further comprises a dual energy wheel unit.

11. A method of heating and cooling a building having a geothermal system with a plurality of solar panels through which heating fluid from a subterranean heating circuit may be circulated and cooling fluid from a subterranean cooling circuit may be circulated, the method comprising the steps of:
    measuring the temperature of the fluid entering the plurality of solar panels;
    automatically switching to the cooling circuit if the temperature of the fluid entering the plurality of solar panels is warmer than the temperature of the fluid exiting the plurality of solar panels; and
    automatically switching to the heating circuit if the temperature of the fluid entering the plurality of solar panels is cooler than the temperature of the fluid exiting the plurality of solar panels.

12. The method of claim 11 of wherein the fluid travels sequentially though the solar panels.

13. The method of claim 11 further comprising the steps of generating ice from the cooling fluid and storing the ice in an ice storage tank.

14. The method of claim 11 wherein the cooling fluid is further chilled by the ice in the ice storage tank.

15. The method of claim 11 further comprising the steps of measuring system data and automatically balancing system operations for maximum efficiency.

16. The method of claim 11 further comprising the step of controlling the temperature of building through the transfer of heat to or from the building.

17. The method of claim 11 further comprising the step of supplying heat to the building through radiant panels.

* * * * *